United States Patent [19]

Pooley et al.

[11] Patent Number: 4,488,950

[45] Date of Patent: Dec. 18, 1984

[54] HEAVY METAL SEPARATION FROM COPPER-BEARING WASTES

[75] Inventors: Frederick D. Pooley; Huw O. Jones; Barry I. Wheatley, all of Cardiff, Wales

[73] Assignee: National Research Development Corporation, London, England

[21] Appl. No.: 566,662

[22] Filed: Dec. 29, 1983

[51] Int. Cl.³ .............................................. C25C 1/16
[52] U.S. Cl. .................................. 204/116; 75/101 R; 75/120
[58] Field of Search ............. 204/116; 75/101 R, 120

[56] References Cited

U.S. PATENT DOCUMENTS

| | | | |
|---|---|---|---|
| 2,124,421 | 7/1938 | Klein | 75/107 |
| 2,655,472 | 10/1953 | Hilliard et al. | 75/120 |
| 3,743,501 | 7/1973 | Cusanelli et al. | 75/120 |

Primary Examiner—R. L. Andrews
Attorney, Agent, or Firm—Oblon, Fisher, Spivak, McClelland & Maier

[57] ABSTRACT

Copper-bearing waste, e.g. brass works flue dust (71% Zn, 3½% Pb, 14% Cu) was mixed with dendritic zinc, and 80 g of the mixture was leached in 1 liter of 10M hot NaOH for 20 minutes. Dissolution of the copper was successfully held down to under 1%, while all the lead and most of the zinc were dissolved. The dendritic zinc was added as 2 parts by mass per 98 parts of the dust, and had a surface area of 5–10 m²/g; it was made by electrolysing a zincate solution.

7 Claims, No Drawings

HEAVY METAL SEPARATION FROM COPPER-BEARING WASTES

This invention relates to the separation of heavy metal values such as of zinc and lead from copper-bearing wastes. Such wastes are for example primary and secondary copper refinery flue dusts, brass foundry flue dusts and steel-making electric arc furnace flue dusts.

Secondary copper refiners' flue dust contains typically 48% Zn, 5½% Pb, 4½% Cu, 1% Sn and ½% Fe; brass works flue dust contains typically 71% Zn, 3½% Pb, 14% Cu and ½% Fe; steel-making electric arc furnace flue dust contains typically 20% Zn, 5% Pb, 0.3% Cu, 0.4% Sn and 22% Fe (all by mass). In leaching zinc and/or lead from such dust it is desirable if the solubility of the copper can be depressed relative to the solubility of lead and zinc.

According to the present invention, a finely divided copper-bearing waste is leached in an alkali metal hydroxide solution having a concentration of from 5M to 12M (preferably 7M to 10M) at a temperature of from 80° C. to boiling point (preferably 90° C. to 100° C.) in a concentration of 50 g to 200 g of said waste per liter of said hydroxide solution (preferably 70 to 100 g/l) such as preferentially to dissolve values other than of copper (e.g. lead and zinc), and the solution containing said values is separated from the copper-bearing residue, the leaching being characterised by adding to the hydroxide solution, simultaneously with or after adding the waste, 1% to 4% zinc based on the mass of the waste, the zinc having a surface area of at least ¼ m²/g, preferably at least 1 m²/g. The zinc may suitably be from electrolysis of zincate solution, such zinc being dendritic and having a typical surface area of 5–10 m²/g.

In this way, the copper stays mostly in the said residue, and thus does not interfere with later stages of recovering other metal values, such as zinc separation and lead separation, which may be conventional (e.g. cementation and electrolysis). Such stages are described in for example UK Patent Specifications Nos. 1568362, 1600022 and 1600287 and do not in themselves form part of the present invention; they will therefore not be further discussed here. The invention will now be described by way of example.

EXAMPLE 1

A sample of flue dust from a secondary copper refinery was treated with the object of dissolving lead and zinc values which it contained but inhibiting dissolution of copper which it also contained.

The dust had the following analysis by weight: Zinc 55%, Lead 6.8%, Copper 11.8%.

Ninety-eight parts by mass of this dust were intimately mixed with two parts of dendritic zinc powder, which will be further described in 'Dendritic Zinc Powder Example'. The mixture was slowly added to a leaching vessel containing 10M sodium hydroxide aqueous solution held at 100° C., to a total of 75 g of the mixture per 1 liter of the solution. The vessel was agitated throughout. The vessel contents were subjected to solid/liquid separation after 30 minutes (strictly, 30 minutes after exactly half the mixture had been added). The separated liquid was analysed, and the described procedure was found to have extracted into solution about 85% of the zinc, about all the lead, and only about 6% of the copper; thus, as was the object of the procedure, dissolution of copper had been substantially inhibited. The analysis of values in the liquid, in detail, was:

|  | Zn | Pb | Cu |
| --- | --- | --- | --- |
| If 100% had been extracted: | *41.9 g/l | 5.0 g/l | 8.7 g/l |
| Actual: | 36.6 g/l | 5.5 g/l | 0.49 g/l |
| Proportion extracted: | 87.4% | 100 +% | 5.6% |

*i.e. 40.4 g/l from the dust plus 1.5 g/l from the two parts of the dendritic zinc powder.

The anomalous result for lead arises from analytical difficulties in this concentration range.

The separated solid, containing principally copper, could be treated by conventional processes for copper filter cake for copper recovery.

The separated solution could be purified by cementation with zinc and filtration and then electrolysed to recover the zinc, as explained in the Dendritic Zinc Powder Example. This too involves processes which are well-known. UK Patent Specifications Nos. 1568362, 1600022 and 1600287 describe suitable processes.

DENDRITIC ZINC POWDER EXAMPLE

As mentioned at the end of Example 1, such a purified solution can be electrolysed to recover zinc. Note that this solution would be not a $Zn^{++}$ solution but a (sodium) zincate solution. The resulting electrolytic zinc would be a dendritic zinc powder. The dendritic zinc powder used in the Examples was made in this way. The specification of this zinc (column 3), with zinc to BS3982 (column 2) and a typical as-produced zinc dust (column 1) for comparison, was:

|  | (1) Typical as-produced Zinc Dust | (2) BS3982 (very fine grade) | (3) Dendritic Zinc Powder |
| --- | --- | --- | --- |
| Total zinc (as weight proportion of material) | 98.5–99.5% | 98% min | 99.95% |
| Elemental zinc | 95–97% | 94% min | 98% |
| Lead | 0.05–0.15% | 0.2% max | 0.05% max |
| Cadmium | 0.02–0.1% | 0.2% max | 0.01% max |
| Bulk density g/ml | 3.0–3.5 | 2.75 | 2.0 max |
| Sieve residues |  |  |  |
| over 150 micron | nil | nil | 3% |
| over 45 micron | 2% max | 0.2% max | 95% |
| Average particle size | 5–9 micron | 2–3 micron | 100 micron |
| Surface area m²/g | 0.17–0.09 | 0.42–0.28 | 5–10 |

The dendritic zinc powder has such a high surface area that it is preferably stabilised against oxidation as soon as possible after it is made. In this Example, this was done by washing the zinc in water to remove sodium ions, then washing in methanol.

Note that, as well as the dendritic zinc powder, zinc to BS3982 would also have been suitable for use in the present invention, although the latter's efficiency at depressing copper dissolution relative to zinc and lead dissolution is lower. The low surface area of typical as-produced zinc dust makes it unsuitable (too inefficient) for use in the present invention.

EXAMPLE 2

A sample of brass works flue dust was treated with the object of dissolving lead and zinc values which it contained but inhibiting dissolution of copper which it also contained. Brass works flue dusts occur during the smelting of brass and are collected in the dust extraction equipment at the brass works. Typically these dusts have a high zinc content with copper and lead as the major impurities. All the metals occur in a finely divided and highly oxidised state.

The sample in question had the following analysis by weight: Zinc 71%, Lead 3.3%, Copper 13.9%.

Ninety-eight parts by mass of this dust were intimately mixed with two parts of the dendritic zinc powder described in the Dendritic Zinc Powder Example. The mixture was added as a batch to a leaching vessel containing 10M sodium hydroxide aqueous solution held at 115° C.; 80 g of the mixture were added per liter of the solution, and the vessel was constantly stirred. After 20 minutes, the solids and liquid in the vessel were separated from each other.

The resulting liquid was found to have the following analysis by atomic absorption spectroscopy:

|  | Zn | Pb | Cu |
| --- | --- | --- | --- |
| If 100% had been extracted: | *57.26 g/l | 2.64 g/l | 11.12 g/l |
| Actual: | 41.76 g/l | 2.74 g/l | 0.093 g/l |
| Proportion extracted: | 73% | 100 +% | 0.84% |

*i.e. 56.8 g/l from the dust plus 0.46 g/l from the two parts of the dendritic zinc powder.

The anomalous result for lead arises from analytical difficulties in this concentration range.

Thus the liquid contained negligible copper, which was the object. The lead and zinc, which were the principal values contained in the liquid, could be separated by conventional processes, such as are mentioned in Example 1. Zinc recovered electrolytically from sodium zincate solution, such as the solution arising following the treatment of the present liquid to remove lead, could be used instead of the dendritic zinc powder from the Dendritic Zinc Powder Example, being indistinguishable therefrom.

The solids separated from the above-mentioned liquid contain approximately nil lead, relatively little zinc, and most of the starting copper. The solids are thus amenable to conventional copper recovery treatment.

We claim:

1. A method of separating heavy metals from copper-bearing waste containing the heavy metals, whereby said heavy metals remain substantially in solution and said copper is retained substantially in a solid residue, which comprises:
   (a) leaching a finely-divided copper-bearing waste in an alkali-metal hydroxide solution at an elevated temperature, wherein said solution has 1 to 4 weight percent of zinc added thereto based on the mass of said waste, and wherein said zinc has a surface area of at least $\frac{1}{4}$ m$^2$ per gram, and
   (b) separating the solution containing said heavy metals from the copper-bearing residue, wherein said alkali-metal hydroxide solution has a concentration of from 5 M to 12 M, said elevated temperature is 80° C. up to the boiling point of the solution, and the concentration of said waste in said alkali-metal hydroxide solution is 50 grams to 200 grams of said waste per liter of said solution.

2. The method according to claim 1, wherein the added zinc is made by electrolysing a zincate solution which is obtained from the solution containing said heavy metals which is separated from the copper-bearing residue.

3. The method according to claim 2, wherein said zinc is dendritic having a surface area of 5 to 10 m$^2$ per gram.

4. The method according to claim 1, wherein the alkali metal hydroxide solution has a concentration of from 7M to 10M.

5. The method according to claim 1, wherein the alkali metal hydroxide solution is at a temperature of from 90° C. to 100° C.

6. The method according to claim 1, wherein the waste is a concentration of 70 to 100 g per liter of the alkali metal hydroxide solution.

7. The method according to claim 1, wherein the added zinc has a surface area of at least 1 m$^2$/g.

* * * * *

UNITED STATES PATENT AND TRADEMARK OFFICE
CERTIFICATE OF CORRECTION

PATENT NO. : 4,488,950

DATED : December 18, 1984

INVENTOR(S) : Pooley et al.

It is certified that error appears in the above-identified patent and that said Letters Patent is hereby corrected as shown below:

On the title page;

- - [30] United Kingdom Application No. 8300276 filed 6 January 1983 - -

Signed and Sealed this

Thirtieth Day of July 1985

[SEAL]

Attest:

DONALD J. QUIGG

Attesting Officer     Acting Commissioner of Patents and Trademarks